Oct. 16, 1951 J. C. ROLFE ET AL 2,571,487
CATTLE CHUTE GATE

Filed Feb. 25, 1949 2 Sheets-Sheet 1

James C. Rolfe
Warren S. White
INVENTORS

James C. Rolfe
Warren S. White
INVENTORS

Patented Oct. 16, 1951

2,571,487

UNITED STATES PATENT OFFICE 2,571,487

CATTLE CHUTE GATE

James C. Rolfe, Oak Ridge, and Warren S. White, Mer Rouge, La.; said Rolfe assignor of three-eighths to J. U. Yeldell, Jr., Mer Rouge, La.

Application February 25, 1949, Serial No. 78,346

4 Claims. (Cl. 119—147)

The present invention relates to new and useful improvements in cattle holding gates, and more particularly to a gate for the end of a chute and including a head clamping mechanism for holding the cattle in the chute.

An important object of the invention is to provide a cattle holding gate through which the cattle may pass after being released from the head holding mechanism without necessitating opening of the gate.

A further object of the invention is to provide a novel head clamping and holding mechanism operated from a safe position at one side of the gate.

A still further object is to provide a cattle holding gate which may be easily and quickly set up in position at one end of a cattle chute or other enclosure.

A still further object is to provide an apparatus of this character of simple and practical construction, which is strong and durable, efficient and reliable in operation, relatively inexpensive to manufacture and otherwise well adapted for the purposes for which the same is intended.

Figure 1:
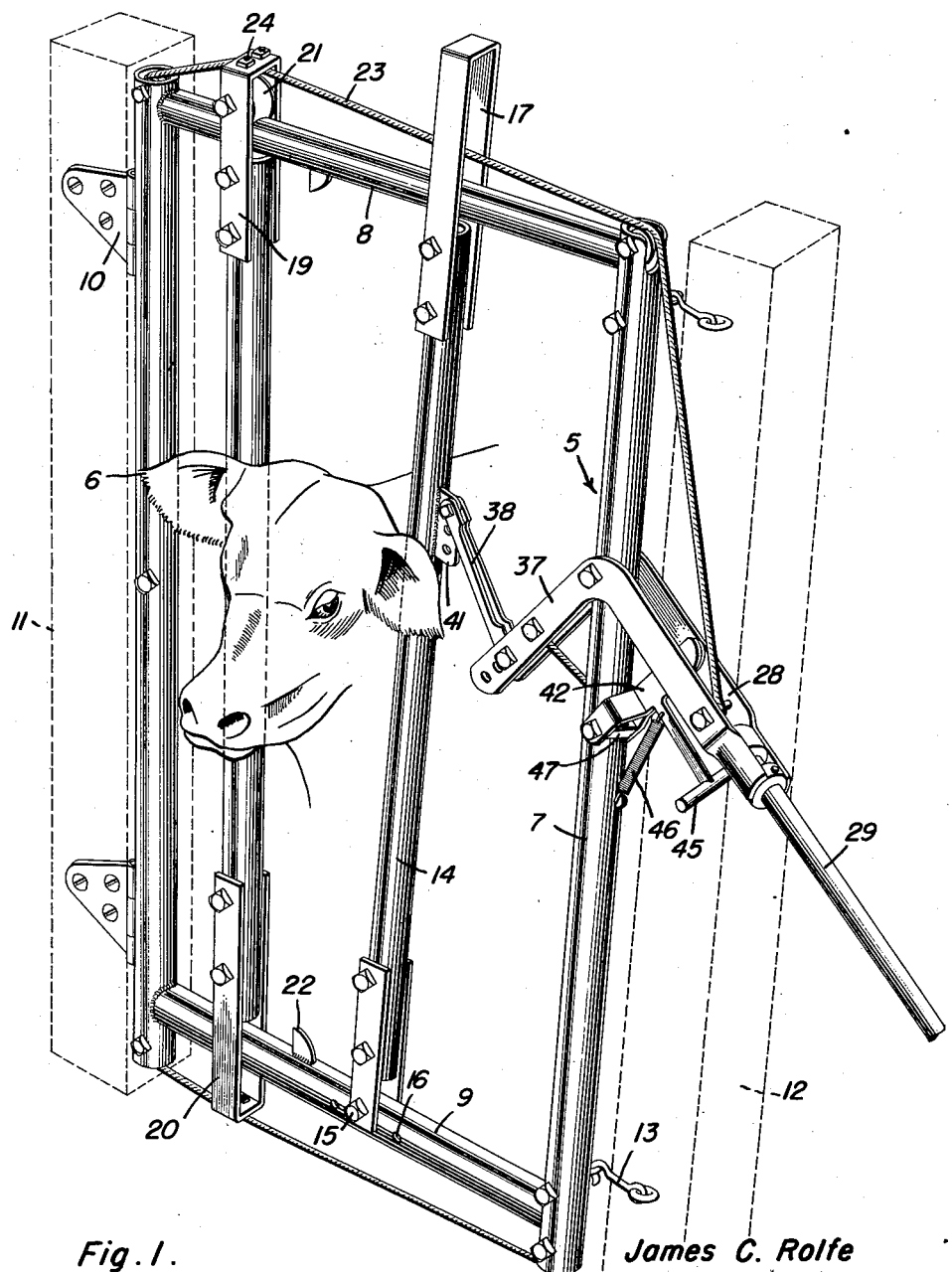
Figure 2:
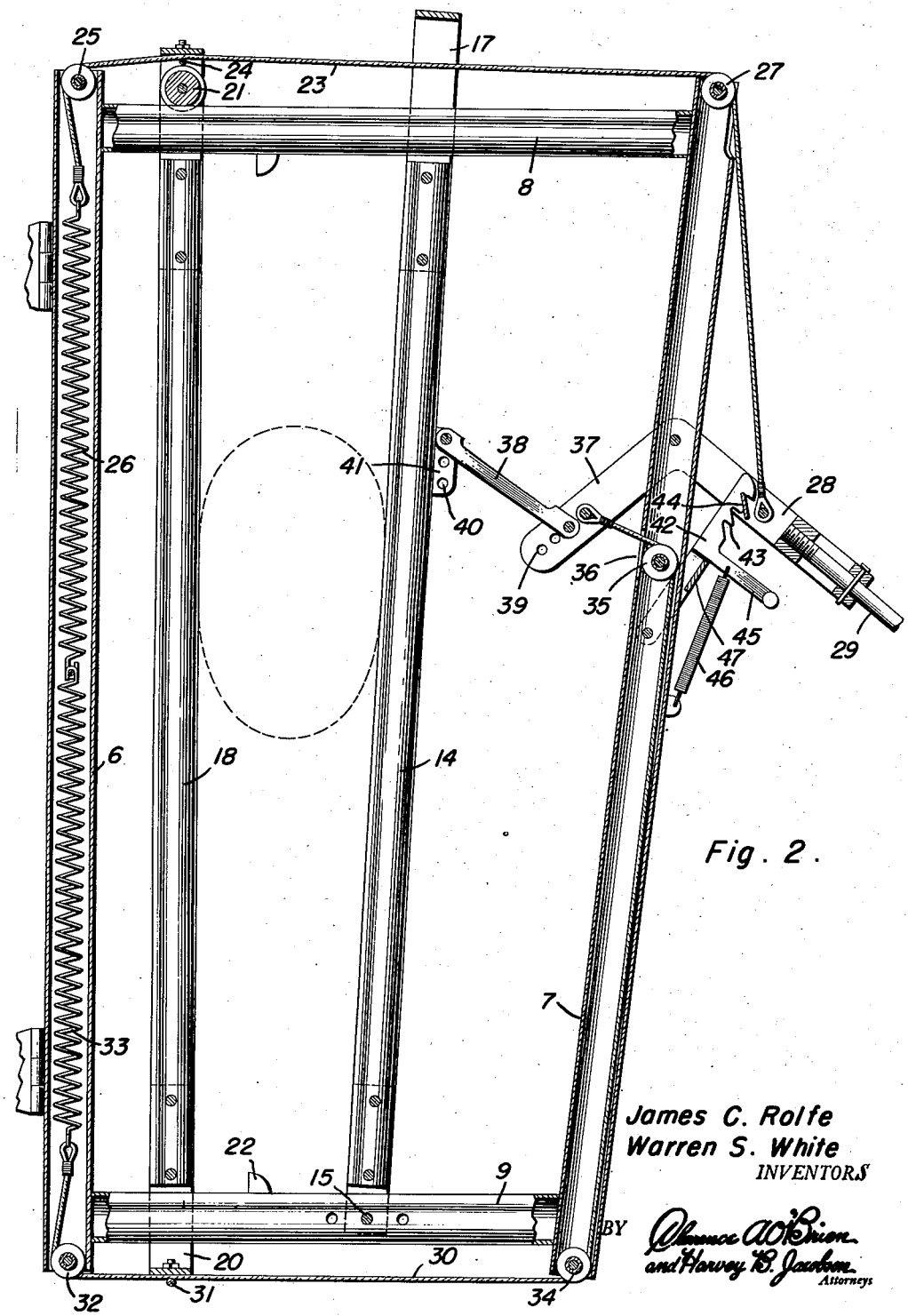

Other objects and advantages reside in the details of construction and operation as more fully hereinafter described and claimed, reference being had to the accompanying drawings forming part hereof, wherein like numerals refer to like parts throughout, and in which:

Figure 1 is a perspective view showing the head holding mechanism of the gate in locked position and, Figure 2 is a vertical sectional view.

Referring now to the drawing in detail, wherein for the purpose of illustration, we have disclosed a preferred embodiment of the invention, the numeral 5 designates generally the gate frame composed of a pair of vertical frame members 6 and 7, and to which upper and lower bars 8 and 9, are rigidly connected. The frame 5 is preferably constructed of tubular metal and with the parts thereof welded or otherwise rigidly connected to each other in a suitable manner.

Hinges 10 of a conventional type connect the vertical frame member 6 to a post 11 of a chute or other enclosure, and the vertical frame member 7 is releasably secured to a post 12 by hooks and eyes 13, which hold the gate in a closed position.

A vertical stanchion bar 14 is pivoted at its lower end to the lower bar 9 for lateral swinging movement by means of a bolt and nut 15 or the like, selectively engaged in openings 16 in the lower bar to adjust the position of the stanchion bar 14 transversely with respect to the gate. An inverted U-shaped guide 17 is secured to the upper end of stanchion bar 14 to slide on the upper bar 8 during swinging movement of the stanchion bar.

A second stanchion bar 18 is provided at its upper and lower ends with U-shaped guides 19 and 20, the guide 19 being inverted for sliding on the upper bar 8 and the lower guide 20 being slidable on the lower bar 9. A roller 21 is journaled in upper guide 19 for riding on the upper rail 8. Stops 22 are provided on the upper and lower bars 8 and 9 to limit sliding movement of the stanchion bar 18 in its closing position with respect to stanchion bar 14 to prevent an animal approaching the gate from passing therethrough between bar 18 and frame member 6.

An upper stanchion operating rope or cable 23 is secured to guide 19 by a U-bolt 24 with one end of the rope or cable trained over a pulley 25 journaled in the upper end of frame member 6 and attached to one end of a coil spring 26, having its other end suitably secured in vertical frame member 6. The other end of rope or cable 23 is trained over a pulley 27, journaled in the upper end of frame member 7, and extends downwardly therefrom for attaching to a lever 28, pivoted to frame member 7 and extending laterally outwardly at the free edge of the gate. The lever is provided at its outer end with a removable handle extension 29 and facilitates handling of the gate and chute to which it is attached.

A lower stanchion operating rope or cable 30 is attached adjacent one end to the lower guide 20 by a U-bolt 31 and extends over a pulley 32 journaled at the lower end of frame member 6 for attaching to one end of a spring 33 positioned in frame member 6 and suitably secured therein.

The rope or cable 30 is also trained over a pulley 34 journaled in the lower end of frame member 7 and extends upperwardly therein, and over an upper pulley 35, and outwardly through an opening 36 in the frame member 7, for attaching to a downwardly and inwardly inclined arm 37 at the inner end of lever 28.

A link 38 is also pivotally attached at one end to the arm 37 for connecting the upper portion of stanchion bar 14 thereto, the ends of the links being adjustable in openings 39 and 40 formed respectively in arm 37 and in a bracket 41 suitably secured to one side of the stanchion bar 14.

The lever 28 is locked in its lower position by means of a latch bar 42, pivoted at one end to the frame member 7, and formed at its upper edge with notches or teeth 43, selectively engaging a lug, pin or the like 44 carried by the lever 28 at a point outwardly of its pivot. The latch bar 42 is provided with a releasing handle 45 which projects forwardly under lever 28 and a coil spring 46 connects the releasing handle 45 to the frame member 7 to hold the latch bar in its locked position and a lug or stop 47 carried at the fork of the latch bar rests against frame member 7 and holds the latch bar in an upwardly inclined position for engaging lug or pin 44 upon a downward or locking movement of lever 28.

In the operation of the device a downward movement of lever 28 will pull upper and lower stanchion operating ropes 23 and 30 against the tension of springs 26 and 33, and cause the stanchion bar 18 to slide in a direction toward stanchion bar 14, such movement being limited by stops 22. At the same time the upper end of stanchion bar 14 is swung rearwardly toward stanchion bar 18 by link 38 connected to arm 37 at the inner end of lever 28, the stanchion bars 14 and 18 thus cooperating in clamping the head of an animal between the bars.

The lever 28 is locked in its lowered position for holding the stanchion bars 14 and 18 in a closed position by latch bar 42.

In order to release the animal the latch bar 42 is swung into its releasing position by handle 45 and springs 26 and 33 will pull ropes or cables 23 and 30 in a direction to slide stanchion bar 18 away from stanchion bar 14 and to swing the upper end of stanchion bar 14 away from stanchion bar 18, the stanchion bar 14 being moved toward the frame member 7 at the front edge of the gate and the stanchion bar 18 moved toward the frame member 6 at the rear edge of the gate to enable the released animal to pass through the gate without necessitating the swinging of the gate into an open position. The danger of an attendant in passing the front of the chute is thus avoided.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A gate comprising a frame including a pair of vertical frame members and top and bottom members, a pair of co-acting stanchion bars supported in an upright position by said top and bottom members, one of said stanchion bars being pivoted for swinging in opposite directions and the other of said stanchion bars being slidable in opposite directions relative to the pivoted bar, a lever pivoted to the frame, a link operatively connecting the lever to the pivoted bar to operate the same in opposite directions and flexible spring tensioned means operatively connecting the lever upon opposite sides of its pivot to the sliding bar to operate the same in opposite directions.

2. A gate comprising a frame including a pair of vertical frame members and top and bottom members, a pair of co-acting stanchion bars supported in an upright position by said top and bottom members and operative to close the stanchion, one of said stanchion bars being pivoted for closing movement and the other of said stanchion bars being slidable relative to the pivoted bar, for closing movement, a lever pivoted to the frame, a link operatively connecting the lever to the pivoted bar to move the same, and upper and lower flexible members connecting the lever upon opposite sides of its pivot to the slidable bar for moving the same.

3. A gate comprising a frame including a pair of vertical frame members and top and bottom members, a pair of co-acting stanchion bars supported in an upright position by said top and bottom members and operative to open and close the stanchion, one of said stanchion bars being pivoted for opening and closing movement and the other said stanchion bars being slidable relative to the pivoted bar for opening and closing movement, a lever pivoted to the frame, a link operatively connecting the lever to the pivoted bar to effect closing movement thereof, upper and lower flexible members connecting the lever upon opposite sides of its pivot to the slidable bar to effect closing movement thereof, and spring means connected to said flexilbe members for operating said lever through said flexible members to effect opening movement of both bars.

4. A gate comprising a frame including a pair of vertical frame members and top and bottom members, a pair of co-acting stanchion bars supported in an upright position by said top and bottom members, one of said stanchion bars being pivoted and the other said stanchion bars being slidable relative to the pivoted bar, a lever pivoted to the frame, a link connecting the lever to the pivoted bar, upper and lower flexible members connecting the lever to the slidable bar, said lever actuating the slidable bar through said flexible members and the pivoted bar through said link.

JAMES C. ROLFE.
WARREN S. WHITE.

REFERENCES CITED

The following references are of record in the file of this patent:

UNITED STATES PATENTS

| Number | Name | Date |
| --- | --- | --- |
| 1,201,245 | Bogda | Oct. 17, 1916 |
| 2,408,872 | Newbold | Oct. 8, 1946 |